UNITED STATES PATENT OFFICE.

OSCAR J. PARKER AND JOSEPH CARDY, OF CEDAR KEYS, FLORIDA.

INSECTICIDE.

SPECIFICATION forming part of Letters Patent No. 283,507, dated August 21, 1883.

Application filed July 2, 1883. (No specimens.)

*To all whom it may concern:*

Be it known that we, OSCAR J. PARKER and JOSEPH CARDY, citizens of the United States, residing at Cedar Keys, in the county of Levy and State of Florida, have invented a new and useful composition of matter to be used to remove and destroy insects of all kinds, of which the following is a specification.

Our compound consists of the following ingredients, combined in the proportions stated, viz: oil of shark's liver, five gallons; kerosene-oil, five gallons; oil of pennyroyal, one ounce. The ingredients are to be thoroughly mingled by agitation.

In using the above-named composition on trees or plants it should be forced on by a pump. To use it on furniture or other wood or substance a brush should be used.

What we claim, and desire to secure by Letters Patent of the United States, is—

The herein-described composition of matter to be used for the destruction of insects, consisting of shark's-liver oil, kerosene-oil, and oil of pennyroyal, as specified.

OSCAR J. PARKER.
JOSEPH CARDY.

Witnesses:
J. M. CUVIN,
W. B. ELLIS.